April 21, 1959 P. F. BECHBERGER 2,883,595
SYNCHRO NULL VOLTAGE SYSTEM AND METHOD
Filed Nov. 20, 1953 2 Sheets-Sheet 1
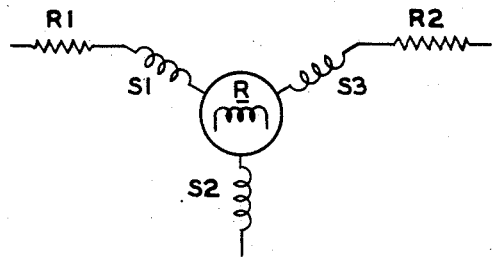
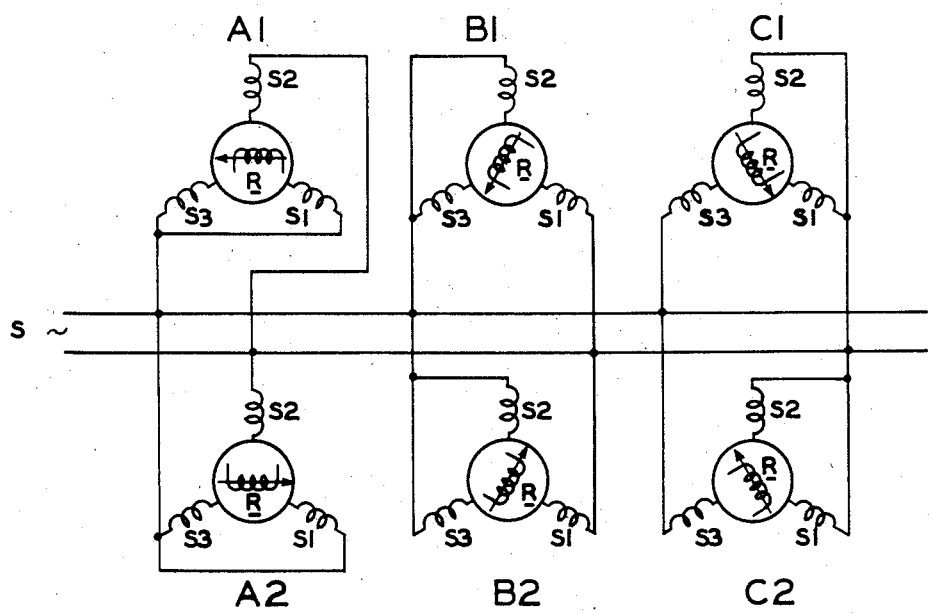
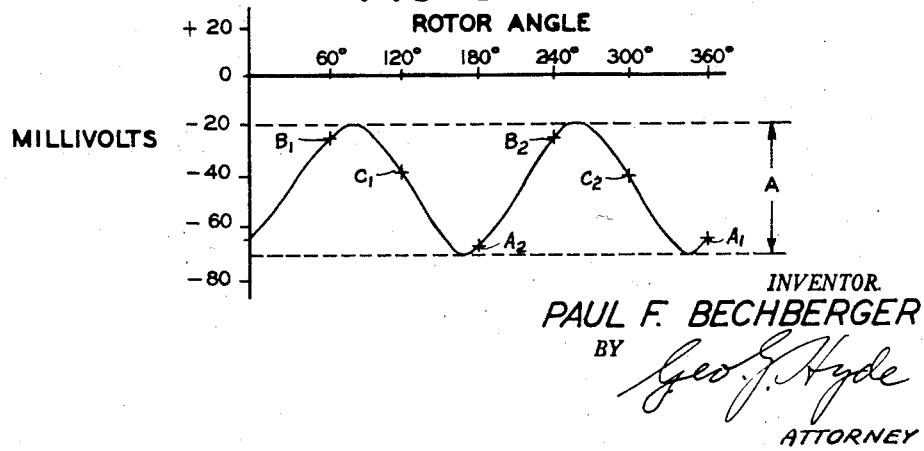
INVENTOR.
PAUL F. BECHBERGER
BY Geo. G. Hyde
ATTORNEY April 21, 1959 P. F. BECHBERGER 2,883,595
SYNCHRO NULL VOLTAGE SYSTEM AND METHOD
Filed Nov. 20, 1953 2 Sheets-Sheet 2
FIG. 4
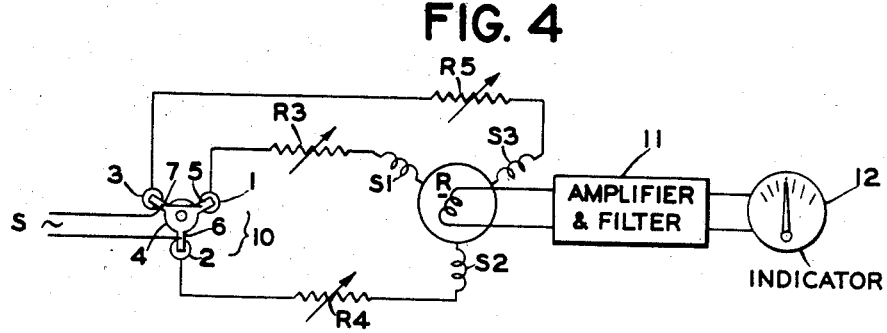
FIG. 5
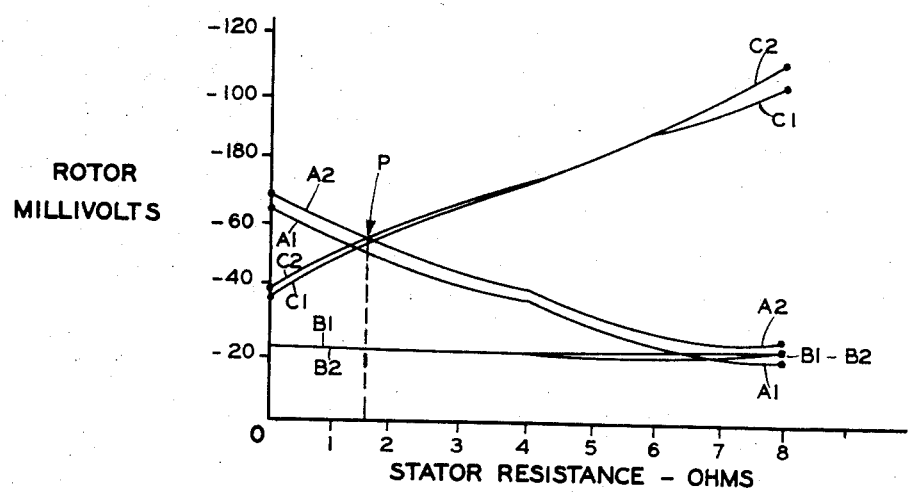
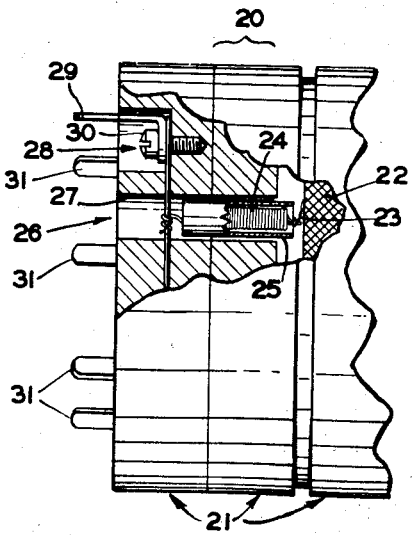
FIG. 6
INVENTOR.
PAUL F. BECHBERGER
BY
*Geo. F. Hyde*
ATTORNEY

United States Patent Office 2,883,595
Patented Apr. 21, 1959

2,883,595

SYNCHRO NULL VOLTAGE SYSTEM AND METHOD

Paul F. Bechberger, Tenafly, N.J., assignor to Bendix Aviation Corporation, Teterboro, N.J., a corporation of Delaware Application November 20, 1953, Serial No. 393,418

6 Claims. (Cl. 318—30)

This invention relates to improvements in synchros, and is particularly directed to means and methods for reducing null voltages.

In control synchros of standard type, having three symmetrical energized windings in the stator and a single winding in the rotor, there are six null positions for the rotor, as hereafter explained in detail. If the rotor and stator could be made absolutely perfect, there would be no voltage across the rotor in any null position. However, slight mechanical and electrical imperfections are inevitable; and therefore in practice voltages do exist at the null positions. For the high degree of synchro accuracy generally required, these null voltages must be kept at a minimum, and manufacturing specifications may include a maximum value which cannot be exceeded. The result has been the rejection of a substantial number of synchros, whose defects could be remedied, if at all, only by further manufacturing operations.

An object of the invention is to provide a novel arrangement and method for reducing such null voltages; and a more specific purpose is to reduce the highest null voltages without objectionably increasing the other null voltages.

A feature of the invention is the discovery that null voltages can be substantially reduced by inserting compensating resistance of proper value in series with either one or two of the stator windings. A purpose of the invention is to provide methods for determining the value of each resistance, which will vary for different synchros. A related object is to provide a method for determining such resistance value empirically in each case. Another purpose is to provide a method and formula for calculating said value.

When the null voltages of a control transformer synchro include excessive values, the fault may be primarily in the stator part alone or in the rotor part alone. A further object of the invention is to provide a method for identifying the part which is the chief cause of excessive null voltages, making it possible to remedy the defect by correcting or replacing that part alone.

The foregoing and other objects and advantages of the invention will appear more fully from consideration of the detailed description which follows, in conjunction with the accompanying drawing, wherein one embodiment of the invention is illustrated. It is to be expressly understood, however, that the drawing is for the purposes of illustration and description and is not to be construed as defining the limits of the invention.

In the drawings:

Fig. 1 is a diagram of a control transformer synchro with null voltage reducing resistors attached;

Fig. 2 is a diagram showing the six null rotor positions and stator connections;

Fig. 3 is a graph of a null voltage curve;

Fig. 4 is a diagram of a synchro testing circuit;

Fig. 5 is a graph of voltage changes caused by resistance variations, and

Fig. 6 is a side view of an end portion of a synchro with parts broken away, showing the mounting of a compensating resistor.

Control transformer synchros are characterized by the fact that their three phase stator is energized, setting up a magnetic field whose orientation depends upon the voltages in the stator windings; and the voltages induced in the rotor have a mathematical relation to the angles between the rotor axis and the field axis. When the rotor is at right angles to the field, no voltage should be induced. However, this result can be obtained only if the transformer is mechanically and electrically perfect. This is impossible in practice, as already noted; but the specified limits for deviation from this standard are generally very rigid, in some cases being 40 or 60 millivolts for rotors having outputs of one volt per degree.

In testing such control transformers, six null positions are established. In each position two of the stator windings are connected to one side of an alternating current source, while the third winding is connected to the other side, and the rotor is positioned at right angles to the latter winding, referred to as the free winding. In this position there theoretically should be no voltage across the rotor. In a typical testing sequence, as shown in Fig. 2, successive null positions of successive pairs of stator windings are connected to each other in clockwise sequence, and the rotor is rotated in 60° stages counterclockwise into positions at right angles to the free windings to provide the six null positions, at each of which a reading of the induced rotor voltage is taken.

This standard procedure is indicated in Fig. 2, which includes a source S of alternating current at the voltage and frequency for which the synchro is designed, the free stator winding at right angles to the rotor being connected to one side of source S, the other two windings being connected in parallel to the other side of said source. The null voltage is read across the rotor R in each of the six successive positions $A_1$, $B_1$, $C_1$, $A_2$, $B_2$, $C_2$, representing a complete revolution of the rotor R in 60° steps, and provides a sequence of six null voltage values, representative of the synchro under test. As an illustrative example, the tests may produce the following null voltages:

| Position | Angle, degrees | mv. | Position | Angle, degrees | mv. |
|---|---|---|---|---|---|
| $A_1$ | 0 | −65 | $A_2$ | 180 | −68 |
| $B_1$ | 60 | −23 | $B_2$ | 240 | −23 |
| $C_1$ | 120 | −39 | $C_2$ | 300 | −40 |

The polarity of a null voltage for present purposes is established by its phase relationship to the excitation voltage. If it leads the excitation voltage, its value is considered positive; if it lags, its value is considered negative.

It appears from the example that the null voltages at $A_1$ and $A_2$, $B_1$ and $B_2$, $C_1$ and $C_2$, pairs of positions in which the rotor is at the same angle but reversed in position, are substantially the same; and it has been found that this is generally the case.

These voltages can be used to determine some important facts about the synchro under test. For this purpose they are plotted, and a smooth sine curve V is drawn through them, illustrated in Fig. 3. This curve will have the form of two complete cycles of error for each rotor revolution, as appears from said figure, and will show by inspection the condition of the stator, low average amplitude A indicating a good stator. A low average of the six null voltages indicates a good rotor. When excessive null voltages are chiefly due to either the stator or the rotor alone, this method will identify the part at fault and permit its correction or replacement without affecting the other part.

It has been found that some unexpected results are obtained by varying the compensating resistances connected to the stator windings in the six null positions. A circuit for obtaining these results is illustrated in Fig. 4. In this circuit stator winding $S_1$ is connected through variable resistor $R_3$ to terminal 1 of switch 10, winding $S_2$ is connected through variable resistor $R_4$ to switch terminal 2, and winding $S_3$ is connected through variable resistor $R_5$ to switch terminal 3. The switch rotor 4 has three insulated contact arms 5, 6 and 7, spaced to engage contacts 1, 2 and 3 simultaneously. Arms 5 and 7 are both connected to one side of A.C. source S, while arm 6 is connected to the other side of the source. Rotor R, which is manually rotatable, is connected through amplifier and filter 11 to the voltmeter type indicator 12. With this arrangement the three test position connections of the stator as shown in Fig. 2 can be made by rotating switch 10, and rotor R can be accurately located for each test position. In view of the high degree of accuracy required, the indicator 12 is specifically designed for the frequency of source S, and is preceded by a filter 11 to make certain that only the desired frequency reaches the indicator. Moreover, the rotor must be adjusted to the exact null angle with great care. Thus, with a properly effective filter 11 the null voltage curve, as corrected herein, may be brought down to a substantially zero value which will be indicated by the reading on the voltmeter 12 of a suitable phase sensitive type well known in the art.

The results of varying one of the resistances in each of the six test positions are shown in Fig. 5. In this instance, for reasons hereafter given, resistor $R_3$, connected to stator winding $S_1$, was varied, resistors $R_4$ and $R_5$ being set at zero. The Fig. 5 graph shows that in each pair of homologous positions of the rotor, such as $A_1$ and $A_2$, the change in rotor millivolts for a given change in $R_3$ is substantially the same. It also appears that as the voltage in the A positions decreases as desired, the voltage in the C positions increases, while the voltage in the B positions remains substantially the same. In the B positions, $B_1$ and $B_2$, the winding $S_1$ is the free winding; and it has been found that variation in a resistance connected to a free winding does not materially affect the null position voltage. This discovery is utilized in reducing the higher null position voltages by locating a null position voltage reducing resistance only in one winding, for example $S_1$, or in both of the windings $S_1$ and $S_2$ that are connected in parallel in that pair of test positions $A_1$—$A_2$ and $C_1$—$C_2$ where the highest null position voltages are found, as shown graphically in Figures 3 and 5.

It is evident from the example that the voltages in the null positions $A_1$ and $A_2$, with the rotor at 0 and 180° respectively, require reduction; and where a maximum of 60 mv. is specified, reduction of this voltage will be sufficient. The stator winding or windings to which compensating resistance should be added to reduce the excessive voltages, and the value of such resistance, must be determined. Since the high null position voltages occur in positions $A_1$ and $A_2$ in the example, it is therefore necessary to add resistance to either $S_1$ or $S_3$, the stator windings connected in parallel in these positions. Tests have shown that adding resistance to one of these windings will increase the null position voltage, and to the other winding will decrease it. The latter winding is of course selected, being $S_1$ in the present instance, connected to resistor $R_3$.

It will be evident from Fig. 5 that the best null position voltage condition that can be obtained by varying resistor $R_3$ is at the intersection of the curves for the A position with the curves for the C positions, at a value of about 1.7 ohms. Since all of the null position voltages at this point are below the 60 mv. specified in this case, the synchro under test will pass if a compensating resistor of 1.7 ohms is attached to stator winding $S_1$.

Improved results may be obtained if the accompanying increase in the voltages in the C null positions, in which $S_1$ is connected to $S_2$, is counteracted by also adding a suitable resistance to $S_2$; and when the voltages in the C null positions are also excessive, this step is necessary. It will have no material effect on the voltages in the A null positions, as $S_2$ is the free winding in those positions, but will increase the voltages in the B null positions while reducing those in the C null positions. However, as the B position voltages have the lowest values, the net result will be an overall reduction in null position voltages. Moreover, the value of $R_3$ may then be selected at a value sufficiently high to reduce the A position voltages to a substantially lower value than the compromise value indicated in Fig. 5. The value of the resistance to be added to winding $S_2$ can be determined in the manner already indicated, and is selected to provide the most advantageous values of the voltages at the B and C null positions relative to each other as well as to the voltages at the A null positions.

This method of determining the location and value of the resistor or resistors to be added, while effective for reducing excessive null position voltages to a value below a specified maximum, requires a certain amount of testing of different resistance value combinations to approach the optimum conditions for all six null positions. The invention therefore comprises also a system for computing the correct values for the one or two resistors required.

In this method the test circuit of Fig. 4, or a similar circuit, may be employed. Setting the circuit of Figure 4 for the A position connections, as shown in Figure 2, with $R_4$ and $R_5$ (or $R_3$) of Figure 4 at zero and the rotor R at 0°, $R_3$ (or $R_5$) is varied until indicator 12 is at zero. In practice, it is found that when two stator windings are connected in parallel in a test position, an increase in the resistance connected to one of them will decrease the null position voltage, while an increase in the resistance in series with the other winding will increase the null position voltage. Naturally the former winding and resistance are selected, and this winding will be referred to herein as the null-reducing stator winding. In the example, $R_3$ and $R_5$ are the resistors in series with the connected windings, $R_3$ being the resistor in series with the null-reducing winding.

The value of $R_3$ is designated as $rS_{1/0}$, which may be called a null resistance value. The rotor R is then turned to 180° and a similar value for $R_3$ obtained, designated as $rS_{1/180}$. $R_3$ and $R_4$ are then set at zero, and null resistance values for $R_5$ with rotor R at 0° and 180° are similarly obtained, designated as $rS_{3/0}$ and $rS_{3/180}$ respectively. These values are then equated:

$$A = \tfrac{1}{2}(rS_{1/0} + rS_{1/180}) - \tfrac{1}{2}(rS_{3/0} + rS_{3/180})$$

That is, A equals the difference between the averages of the null resistance values of the two connected stator windings in the A test position, with the averages for the winding earlier in numerical sequence subtracted from those of the other winding, winding $S_3$ being considered as preceding winding $S_1$, the sequence being cyclical.

Null resistance values are similarly obtained in the B test position by varying resistors $R_4$ and $R_5$, and a corresponding equation is developed.

$$B = \tfrac{1}{2}(rS_{3/60} + rS_{3/240}) - \tfrac{1}{2}(rS_{2/60} + rS_{2/240})$$

In the same manner the null resistance values for test position C are derived, and are inserted in the formula $$C = \tfrac{1}{2}(rS_{2/120} + rS_{2/300}) - \tfrac{1}{2}(rS_{1/120} + rS_{1/300})$$

The resistance value of one of the terms in each expression in parentheses will always be zero, so that term will disappear in practice.

These three results are then averaged to get a value D.

$$D = \tfrac{1}{3}(A + B + C)$$

The values A, B and C will be termed the test position values and D will be called the rotor value.

The most negative or the least positive value in an algebraic sense of A, B and C is then selected, D is subtracted from it, and the sign is changed. The result will be the value of the compensating resistor to be connected to the preceding winding in the equation for the selected most negative test position value. For simplicity of identification the winding in the first term of each equation will be called the succeeding winding, and the winding in the second term is the preceding winding. No compensating resistance will be required for the next stator winding in inverse numerical order. The value for the compensating resistor to be added to the remaining stator winding is determined by subtracting the rotor value from the test position value obtained from the equation in which the latter winding precedes, changing the sign and adding the value of the compensating resistor already determined.

For instance, assume that B is most negative or has the least positive value in an algebraic sense, C is intermediate and A is least negative or has the most positive value in an algebraic sense. Then $$B - D = -r_3$$

and $r_3$ is the value of the compensating resistance to be added to $S_2$, the preceding winding in the equation from which B is derived.

No resistance will be added to $S_1$, the preceding winding in deriving C.

The resistance $r_1$ to be added to $S_3$ is derived from the equations:

$$A - D = -r$$
$$r + r_3 = r_1$$

That is, the value of the remaining resistance is obtained by adding to the value of the first resistance a value obtained by subtracting from the rotor value the value of the least negative test position.

The required values of compensating resistors are so low that they can readily be made in very small sizes, adapted for mounting within the casing of standard synchros, the resistor forming a part of the connected winding impedance and of the synchro unit, both electrically and mechanically, so that it does not affect the mounting or connections of the synchro, while improving its operation regardless of the circuit in which it is connected. A compensating resistor mounting of this type is illustrated in Fig. 6, in which an end portion of a synchro 20 includes a body, made up of numerous parts in well-known manner and indicated generally at 21, and an end of one stator winding 22 having a lead 23. A coil type compensating resistor 24 in an insulating tube 25, partly broken away, is mounted in a bore 26 in body 21 with one end connected to lead 23 of winding 22 and the other end to a connector 27 extending into socket 28, where it is held in contact with stator winding connection lug 29 by mounting screw 30. Similar connecting lugs 31 are provided for the other stator and rotor windings in well-known manner.

Although but one embodiment of the invention has been illustrated and described in detail, it is to be expressly understood that the invention is not limited thereto. Various changes can be made in the arrangement of the parts and in the indicated operations without departing from the spirit and scope of the invention, as the same will now be understood by those skilled in the art.

In particular, while the type of synchro having three stator windings has been described, the same procedure and results are applicable to the type in which the three windings are in the rotor; and while the three winding element is designated the stator and the other element the rotor herein to avoid awkward and possibly obscure terminology, it is to be understood that the specified characteristics of these elements may be reversed, in a manner known to the art, within the scope of the invention. Also, while a common method of energizing the three windings in the three test positions has been shown, other methods of energizing are known and can be used.

I claim:

1. A synchro, comprising a casing, a stator in the casing having a plurality of symmetrical windings, a rotor mounted for rotation in the casing and having a winding arranged for location in a plurality of null positions when the stator windings are energized, and having an undesired induced voltage in at least one null position in the absence of compensation, connection elements for said windings mounted on the casing at one end thereof, said casing having a bore therein opening at said one end, and means for reducing said voltage, including a compensating resistor removably mounted in the casing bore and connected between one of said elements and a stator winding, said resistor having a voltage reducing value in the latter null position.

2. The method of reducing null position voltages in a synchro having a stator with three symmetrical windings and a rotor having a winding inductively coupled thereto and arranged for location in six null positions when the stator is energized with cyclically successive pairs of windings connected in parallel and the remaining winding free, and having an undesired induced voltage in said rotor winding in at least one null position in the absence of compensation, which comprises connecting a compensating resistor directly in series with a null voltage reducing winding of the pair of windings connected in the latter null position, determining the changes in voltages induced in said rotor winding in the latter null position and in other null positions produced by varying the value of the connected compensating resistor, and selecting a value for said resistor at which the optimum overall low values for all of such null position voltages are obtained.

3. The method of reducing null position voltages in a synchro having a stator with three symmetrical windings and a rotor having a winding inductively coupled thereto and arranged for location in six null positions when the stator is energized with cyclically successive pairs of windings connected in parallel and the remaining winding free, and having an undesired induced voltage in said rotor winding in at least one null position in the absence of compensation, which comprises connecting a compensating resistor directly in series with the null voltage reducing winding of the pair of windings connected in the latter null position, determining the voltage induced in said rotor winding in the latter null position for increases in the resistance value, determining the voltage induced in said rotor winding in another null position for said increases in resistance value, and selecting for said resistance the value at which the latter two null position voltages are reduced to about the same value.

4. Apparatus for testing a synchro transformer having a stator including a body portion and a plurality of symmetrical windings, a rotor carried by said body portion and having a winding, means for energizing said stator windings, said rotor winding arranged for location in a plurality of null positions when the stator windings are energized; said apparatus comprising means for indicating an undesired induced voltage in the rotor winding in at least one null position in the absence of compensation, and means for reducing said voltage, including a variable compensating resistor connector directly in series with a stator winding and adjustable in a sense to reduce the voltage induced in the rotor winding in the latter null position, whereby there may be determined the electrical resistance needed to reduce the average null position voltage of the synchro transformer to within predetermined minimum limits.

5. Apparatus for testing a synchro transformer having a stator including a body portion and three symmetrical windings, an associated rotor carried by said body portion and having a winding, arranged for location in six null positions when the stator windings are energized; said apparatus comprising rotary switch means for energizing cyclically successive pairs of said stator windings connected in parallel and the remaining stator winding connected in series therewith, means for indicating an undesired induced voltage in the rotor winding, the rotor winding having the highest undesired voltage in a first null position and the next highest undesired voltage in a second null position at an angle to the first, and means for reducing said highest voltage without means for reducing said next highest voltage, comprising a variable compensating resistor connected directly in series with one of the pair of windings connected in the first null position, said resistor being adjustable to a value at which the null position voltages induced in the rotor winding in the first and and second null positions are about the same, whereby there may be determined the electrical resistance needed to reduce the average null position voltage of the synchro transformer to within predetermined minimum limits.

6. Apparatus for testing a synchro transformer having a coupling winding capable of selective adjustment into predetermined null positions relative to each of three phase windings, and each of said three phase windings electrically connected at one end to a common juncture; said testing apparatus comprising a three pole, three position switch including a first set of three switch members, a second set of three switch members simultaneously contacting the three switch members of the first set, one of said sets of switch members being movable relative to the other of said sets so that one of said sets of switch members may selectively contact the switch members of the other set, variable resistance elements electrically connected between the switch members of said first set and the three phase windings, means electrically connecting two members of the second set of switch members together and to one terminal of a source alternating current, other means electrically connecting the other member of the second set of switch members to an opposite terminal of the source of alternating current so that by selective adjustment of the three position switch any two of said three phase windings may be selectively energized in parallel relation while another of said three phase windings may be energized in serial relation to said two parallel windings, a voltmeter, means electrically connecting the voltmeter to the coupling winding so that said voltmeter may indicate the voltage induced in the coupling winding upon the selective adjustment of the coupling winding into the predetermined null positions relative to said other phase winding, and the variable resistance element of at least one of said parallel windings being selectively adjustable to reduce the voltage induced in said coupling winding in at least one of said predetermined null positions, whereby upon such selective adjustments of the switch, coupling winding and resistance elements there may be determined the electrical resistance needed to reduce the average voltage induced in said coupling winding in said null positions to within predetermined minimum limits.

References Cited in the file of this patent

UNITED STATES PATENTS

| | | |
|---|---|---|
| 2,581,436 | McCarthy | Jan. 8, 1952 |
| 2,609,435 | Gerth | Sept. 2, 1952 |
| 2,651,010 | Wendt | Sept. 1, 1953 |
| 2,700,745 | Oepp et al. | Jan. 25, 1955 |
| 2,740,935 | Statsinger | Apr. 3, 1956 |